(12) United States Patent
Jin et al.

(10) Patent No.: US 12,548,820 B2
(45) Date of Patent: *Feb. 10, 2026

(54) BATTERY MODULE AND METHOD FOR MANUFACTURING THE SAME

(71) Applicant: LG Energy Solution, Ltd., Seoul (KR)

(72) Inventors: Hee Jun Jin, Daejeon (KR); Kyung Woo Kim, Daejeon (KR); Jeong Oh Moon, Daejeon (KR); Ho June Chi, Daejeon (KR); Jin Yong Park, Daejeon (KR); Jhin Ha Park, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 899 days.

This patent is subject to a terminal disclaimer.

(21) Appl. No.: 17/783,147

(22) PCT Filed: Apr. 30, 2021

(86) PCT No.: PCT/KR2021/005524
§ 371 (c)(1),
(2) Date: Jun. 7, 2022

(87) PCT Pub. No.: WO2021/251623
PCT Pub. Date: Dec. 16, 2021

(65) Prior Publication Data
US 2023/0014249 A1 Jan. 19, 2023

(30) Foreign Application Priority Data
Jun. 10, 2020 (KR) .................. 10-2020-0070472

(51) Int. Cl.
*H01M 10/6551* (2014.01)
*H01M 10/04* (2006.01)
(Continued)

(52) U.S. Cl.
CPC ....... *H01M 10/6551* (2015.04); *H01M 10/04* (2013.01); *H01M 10/613* (2015.04); *H01M 10/617* (2015.04)

(58) Field of Classification Search
None
See application file for complete search history.

(56) References Cited

U.S. PATENT DOCUMENTS

2012/0009455 A1* 1/2012 Yoon ................. H01M 10/6554
429/120
2012/0060921 A1 3/2012 Jee
(Continued)

FOREIGN PATENT DOCUMENTS

CN 202434670 U 9/2012
CN 102971901 A 3/2013
(Continued)

OTHER PUBLICATIONS

Extended European Search Report including Written Opinion for Application No. 21821557.2 dated Jul. 17, 2023, pp. 1-7.
(Continued)

*Primary Examiner* — Maria Laios
(74) *Attorney, Agent, or Firm* — Lerner David LLP

(57) ABSTRACT

The present invention relates to a battery module comprising: a plurality of battery cells disposed to overlap each other in a thickness direction thereof; a battery case configured to accommodate the battery cells and having a structure of which a lower portion is opened; and a heat dissipation member comprising a cover plate coupled to the lower portion of the battery case to support the battery cell and a heat dissipation body provided on one surface of the cover plate, on which the battery cell is supported, to dissipate heat generated in the battery cell, wherein the heat dissipation body comprises first heat transfer materials, which are aligned in plurality of rows in a longitudinal direction of the
(Continued)

battery cell on one surface of the cover plate, and the first heat transfer materials are aligned so that an interval therebetween is gradually narrowed from a center to both ends of the battery cell to gradually improve heat dissipation performance from the center to both the ends of the battery cell.

13 Claims, 24 Drawing Sheets

(51) Int. Cl.
  *H01M 10/613* (2014.01)
  *H01M 10/617* (2014.01)

(56) References Cited

U.S. PATENT DOCUMENTS

| | | | |
|---|---|---|---|
| 2012/0171543 | A1 | 7/2012 | Hirsch et al. |
| 2013/0130137 | A1 | 5/2013 | Chung |
| 2013/0236753 | A1 | 9/2013 | Yue et al. |
| 2016/0190660 | A1 | 6/2016 | Yue et al. |
| 2016/0197385 | A1 | 7/2016 | Matsumoto et al. |
| 2016/0301118 | A1 | 10/2016 | Chami et al. |
| 2019/0198952 | A1 | 6/2019 | Choi et al. |
| 2020/0313253 | A1* | 10/2020 | Ahn ............... H01M 10/613 |
| 2022/0131207 | A1 | 4/2022 | Ahn |

FOREIGN PATENT DOCUMENTS

| | | |
|---|---|---|
| CN | 105409031 A | 3/2016 |
| EP | 2405528 A1 | 1/2012 |
| EP | 3032607 A1 | 6/2016 |
| JP | 2002043784 A | 2/2002 |
| JP | 2005317455 A | 11/2005 |
| JP | 2014157763 A | 8/2014 |
| JP | 2015153743 A | 8/2015 |
| JP | 2018018629 A | 2/2018 |
| KR | 20120053476 A | 5/2012 |
| KR | 101233318 B1 | 2/2013 |
| KR | 101390872 B1 | 5/2014 |
| KR | 20170019041 A | 2/2017 |
| KR | 101757382 B1 | 7/2017 |
| KR | 20170107798 A | 9/2017 |
| KR | 101827402 B1 | 2/2018 |
| KR | 20180023699 A | 3/2018 |
| KR | 20190078521 A | 7/2019 |
| KR | 102065748 B1 | 1/2020 |
| KR | 20200004202 A | 1/2020 |
| KR | 20200030967 A | 3/2020 |
| KR | 20200044423 A | 4/2020 |
| WO | 2020009465 A1 | 1/2020 |

OTHER PUBLICATIONS

International Search Report for PCT/KR2021/005524 dated Aug. 6, 2021. 6 pgs.
Search Report dated Jun. 3, 2025 from the Office Action for Chinese Application No. 202180006582.2 issued Jun. 5, 2025, pp. 1-3.

* cited by examiner

BATTERY MODULE AND METHOD FOR MANUFACTURING THE SAME

CROSS-REFERENCE TO RELATED APPLICATION

This application is a national stage entry under 35 U.S.C. § 371 of International Application No. PCT/KR2021/005524, filed on Apr. 30, 2021, which claims priority to Korean Patent Application No. 10-2020-0070472, filed on Jun. 10, 2020, the disclosures of which are hereby incorporated by reference in their entireties.

TECHNICAL FIELD

The present invention relates to a battery module and a method for manufacturing the same, and more particularly, to a battery module, in which a battery cell increases in heat dissipation performance and decreases in temperature deviation, and a method for manufacturing the same.

BACKGROUND ART

In general, secondary batteries refer to chargeable and dischargeable, unlike primary batteries that are not chargeable. The secondary batteries are being widely used for mobile phones, notebook computers, and camcorders, power storage device, electric vehicles, and the like.

Such a secondary battery is classified into a can type secondary battery in which an electrode assembly is built in a metal can and a pouch type secondary battery in which an electrode assembly is built in a pouch. The pouch type secondary battery comprises an electrode assembly in which an electrode and a separator are alternately stacked, and a pouch accommodating the electrode assembly.

As interests in the depletion of fossil fuels and environmental pollution increase, studies on hybrid vehicles and electric vehicles have been actively conducted in recent years, and a battery pack is mounted on each of the hybrid vehicles or electric vehicles.

The battery pack comprises a battery module comprising a plurality of battery cells, and the plurality of battery cells are connected to each other in series or parallel to increase in capacity and output.

However, the above-described battery module generates more heat as the capacity and output increase, and thus, if the heat generated from the battery module is not smoothly released to the outside, deterioration, ignition, and explosion of the battery module may occur.

DISCLOSURE OF THE INVENTION

Technical Problem

The present invention has been invented to solve the above problems, and according to the present invention, a heat dissipation structure of a battery module may be improved to smoothly discharge heat generated in the battery module to the outside, thereby improving heat dissipation performance of the battery module. Particularly, an object of the present invention is to provide a battery module that is capable of reducing a temperature deviation of the entire battery module and a method for manufacturing the same.

Technical Solution

A battery module according to the present invention for achieving the above objects comprises: a plurality of battery cells disposed to overlap each other in a thickness direction thereof; a battery case configured to accommodate the battery cells and having a structure of which a lower portion is opened; and a heat dissipation member comprising a cover plate coupled to the lower portion of the battery case to support the battery cell and a heat dissipation body provided on one surface of the cover plate, on which the battery cell is supported, to dissipate heat generated in the battery cell, wherein the heat dissipation body comprises first heat transfer materials, which are aligned in plurality of rows in a longitudinal direction of the battery cell on one surface of the cover plate, and the first heat transfer materials are aligned so that an interval therebetween is gradually narrowed from a center to both ends of the battery cell to gradually improve heat dissipation performance from the center to both the ends of the battery cell.

The one surface of the cover plate may comprise first accommodation surfaces that are partitioned at both ends in a thickness direction of the battery cell and a second accommodation surface partitioned between the first accommodation surfaces, wherein the first and second accommodation surfaces extend in a longitudinal direction of the battery cell, and the first heat transfer materials may be provided on the first accommodation surface.

An interval between the first heat transfer material and the first heat transfer material, which have the narrowest interval therebetween, among the first heat transfer materials arranged on the first accommodation surfaces may be greater than a thickness of the first heat transfer material.

The heat dissipation body may further comprise a plurality of second heat transfer materials arranged in a width direction of the battery cell on the second accommodation surface, and the second heat transfer materials may be arranged at the same interval on the second accommodation surface.

The plurality of second heat transfer materials arranged on the second accommodation surface may be spaced apart from each other so as not to be connected to each other and be spaced apart from the first heat transfer materials arranged on the first accommodation surfaces so as not to be connected to the first heat transfer materials.

A pair of heat dissipation pads, which reduces a temperature deviation between a center and both the ends of the battery cell by releasing the heat generated at both the ends of the battery cell may be provided on both ends of an inner surface of the battery case, respectively.

A finishing pad that finishes a space between the pair of heat dissipation pads may be provided on the inner surface of the battery case between the pair of heat dissipation pads.

The first heat transfer materials arranged at both the ends in the longitudinal direction of the battery cell may have a "C" shape of which an end faces the outside of the battery cell.

The one surface of the cover plate may comprise first accommodation surfaces that are partitioned at both ends in a thickness direction of the battery cell and a second accommodation surface partitioned between the first accommodation surfaces, wherein the first and second accommodation surfaces extend in a longitudinal direction of the battery cell, the first heat transfer materials may have a structure, in which the first heat transfer materials are connected in a concave-convex shape from one end to the other end of the first accommodation surface, and the heat dissipation body may further comprise a second heat transfer material provided in the longitudinal direction of the battery cell on the second accommodation surface and connected to the other end of each of the first heat transfer materials.

A method for manufacturing a battery module according to the present invention comprises: a disposition step of disposing a plurality of battery cells to overlap each other in a thickness direction; an accommodation step of accommodating the plurality of overlapping battery cells in a battery case of which a lower portion is opened; a preparation step of preparing a heat dissipation member comprising a cover plate and a heat dissipation body provided on one surface of the cover plate, on which the battery cells are supported; and a coupling step of coupling the cover plate of the heat dissipation member to a lower portion of the battery case, wherein the preparation step comprises a first apply process, in which a first heat transfer material is applied to be aligned in a plurality of rows in a longitudinal direction of the battery cell on one surface of the cover plate, wherein the first heat transfer materials are aligned so that an interval between the first heat transfer materials is gradually narrowed from a center to both ends of the battery cell.

The preparation step may comprise, before the first apply process, a partitioning process of partitioning first accommodation surfaces at both ends in a thickness direction of the battery cell on one surface of the cover plate and partitioning a second accommodation surface is partitioned between the first accommodation surfaces, and in the first apply process, the first heat transfer materials may be applied on the first accommodation surface.

The preparation step may further comprise, after the first apply process, a second apply process of applying a plurality of second heat transfer materials to be arranged in a width direction of the battery cell on the second accommodation surface.

In the second apply process, the plurality of second heat transfer materials may be applied so as not to be connected to each other and so as not to be connected to the first heat transfer materials arranged on the first accommodation surface.

The accommodation step may further comprise a process of respectively attaching heat dissipation pads to both ends of an inner surface of the battery case, which correspond to both the ends of the battery cell.

The accommodation step may further comprise a process of attaching a finishing pad to the inner surface of the battery case between the heat dissipation pads.

Advantageous Effects

The battery module according to the present invention may comprise the plurality of battery cells, the battery case, and the heat dissipation member comprising the cover plate and the heat dissipation body. The heat dissipation body may comprise the first heat transfer material having the structure, which is arranged in the plurality of rows on one surface of the cover plate in the longitudinal direction of the battery cell. Due to the above-described characteristics, the heat generated in the battery cell may be smoothly released through the first heat transfer material arranged in the plurality of rows, and thus, the increase in temperature of the battery module may be significantly suppressed.

Particularly, the first heat transfer materials may be arranged so that an interval therebetween is gradually narrowed from the center toward both the ends of the battery cell. Due to the above-described characteristic, the heat dissipation performance may be gradually improved from the center toward both the ends of the battery cell, and thus, the temperature deviation from the center to both the ends of the battery cell may be reduced to improve the performance of the battery module.

In addition, in the battery module according to the present invention, the cover plate may comprise the first accommodation surface and the second accommodation surface, and the first heat transfer material may be provided on the first accommodation surface provided at each of both the ends of the cover plate. Due to the above-described characteristics, the heat dissipation performance of the battery cell disposed at the end of the battery case may be improved.

In addition, in the battery module according to the present invention, the heat dissipation body may further comprise the second heat transfer material having the structure, which is arranged in the plurality of rows in the width direction of the battery cell, on the second accommodation surface. Due to the above-described characteristics, the heat generated in the battery cell disposed at the center among the plurality of battery cells may be smoothly released to the outside to reduce the temperature deviation of the plurality of battery cells.

Particularly, the plurality of second heat transfer materials may have the structure, in which the second transfer materials are arranged at the same interval on the second accommodation surface. Due to the above-described characteristic, the two or more battery cells disposed at the center among the plurality of battery cells may have the uniform heat dissipation performance, and thus, the temperature deviation of the battery cells may be significantly reduced.

In addition, in the battery module according to the present invention, the interval between the first heat transfer materials having the narrowest interval therebetween among the first heat transfer materials arranged on the first accommodation surface may be greater than the thickness of each of the first heat transfer material. Due to the above-described characteristic, even if the first heat transfer material is stretched by the weight of the battery cell, the spaced state between the first heat transfer materials corresponding to each other may be maintained, and thus, the state in which the temperature deviation of the battery cells is reduced may be maintained.

In addition, in the battery module according to the present invention, the plurality of second heat transfer materials arranged on the second accommodation surface may be spaced apart from each other without being connected to each other before the battery cell is supported and also may not be connected to the first heat transfer materials arranged on the first accommodation surface. Also, after the battery cell is supported, the plurality of second heat transfer materials and the plurality of first heat transfer materials may be connected to each other while being stretched. Due to the above-described characteristics, the heat generated in the battery cell may be released to the outside through the first and second heat transfer materials, and thus, the temperature deviation of the entire battery cell may be reduced.

In addition, in the battery module according to the present invention, the pair of heat dissipation pads, which reduces the temperature deviation between the center and both the ends of the battery cell by releasing the heat generated at both the ends of the battery cell may be provided at both the ends of the inner surface of the battery case, respectively. Due to the above-described characteristic, the heat dissipation performance at both the ends of the upper portion of the battery cell may be significantly improved, and thus, the temperature deviation of the entire battery cell may be significantly reduced.

BRIEF DESCRIPTION OF THE DRAWINGS

FIGS. 23 and 24 are views of an experimental example, wherein FIG. 23 is a thermal image photograph of a battery cell according to Comparative Example, and FIG. 24 is a thermal image photograph of a battery cell according to Embodiment.

MODE FOR CARRYING OUT THE INVENTION

Figure 1:
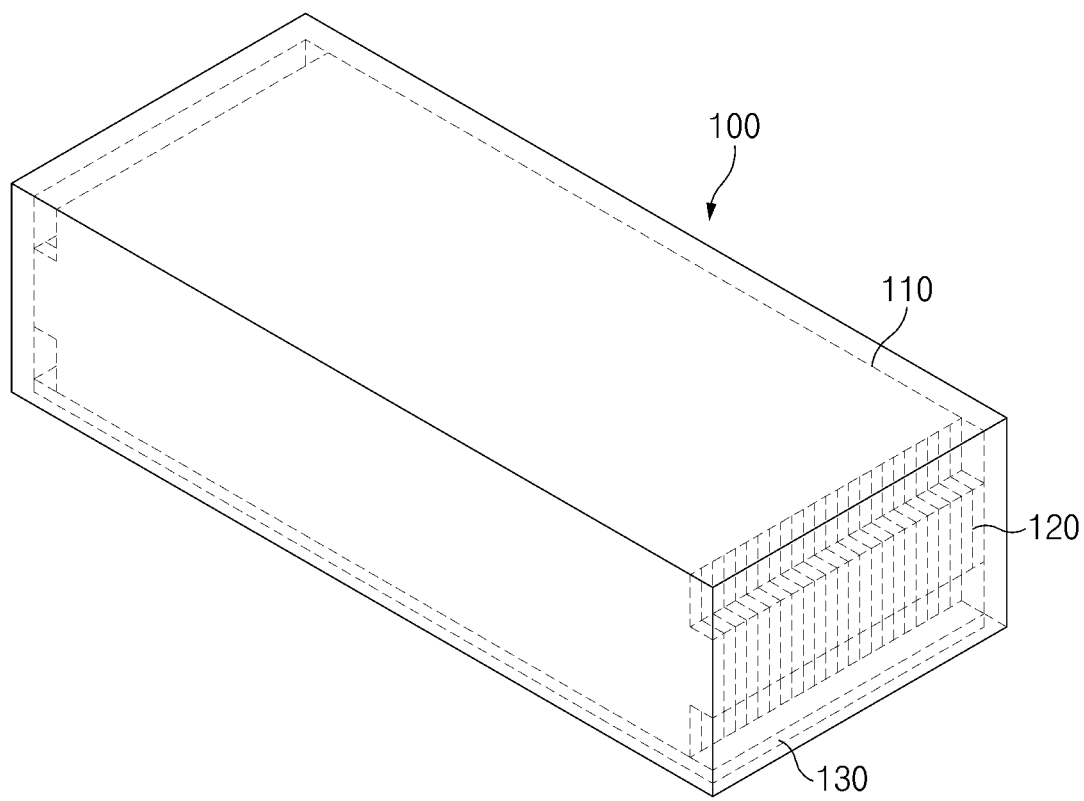
FIG. 1 is a perspective view of a battery module according to a first embodiment of the present invention.
Figure 2:
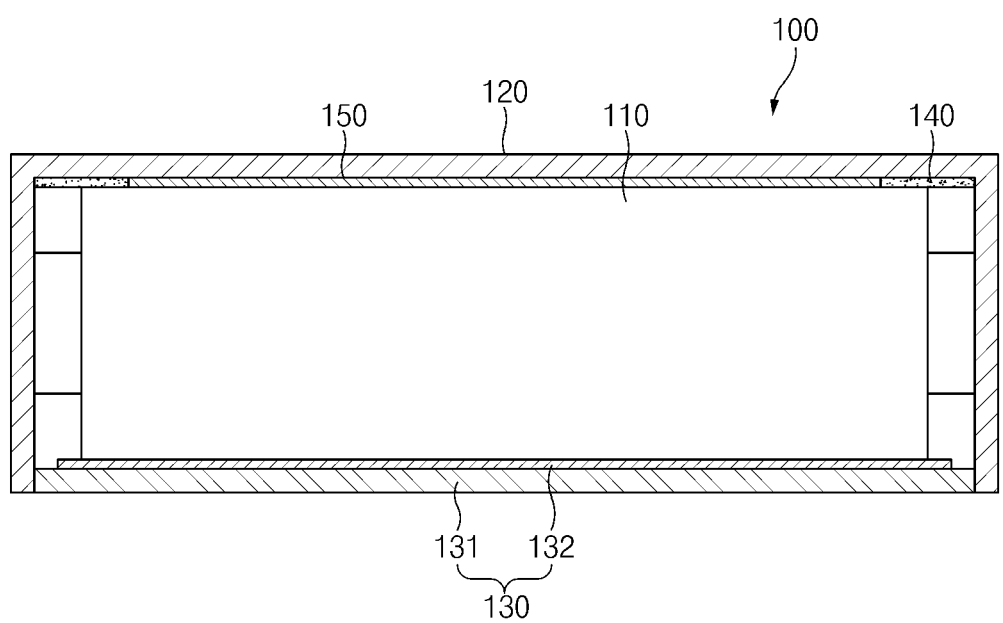
FIG. 2 is a cross-sectional view of FIG. 1.
Figure 3:
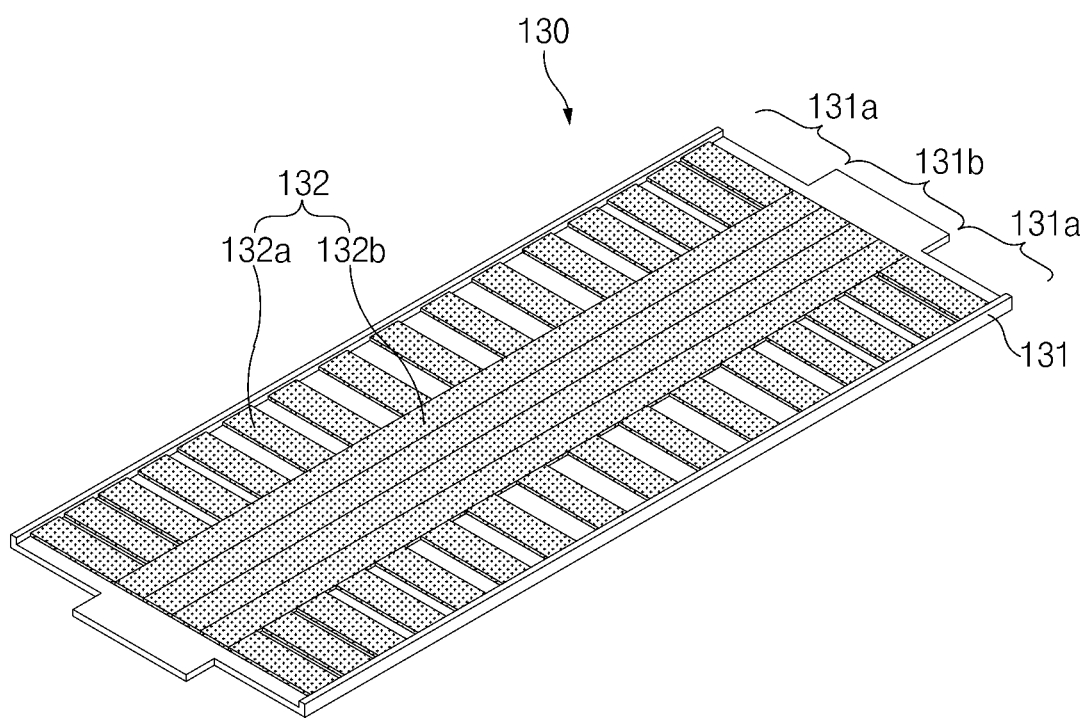
FIG. 3 is a perspective view illustrating a heat dissipation member of the battery module according to the first embodiment of the present invention.
Figure 4:
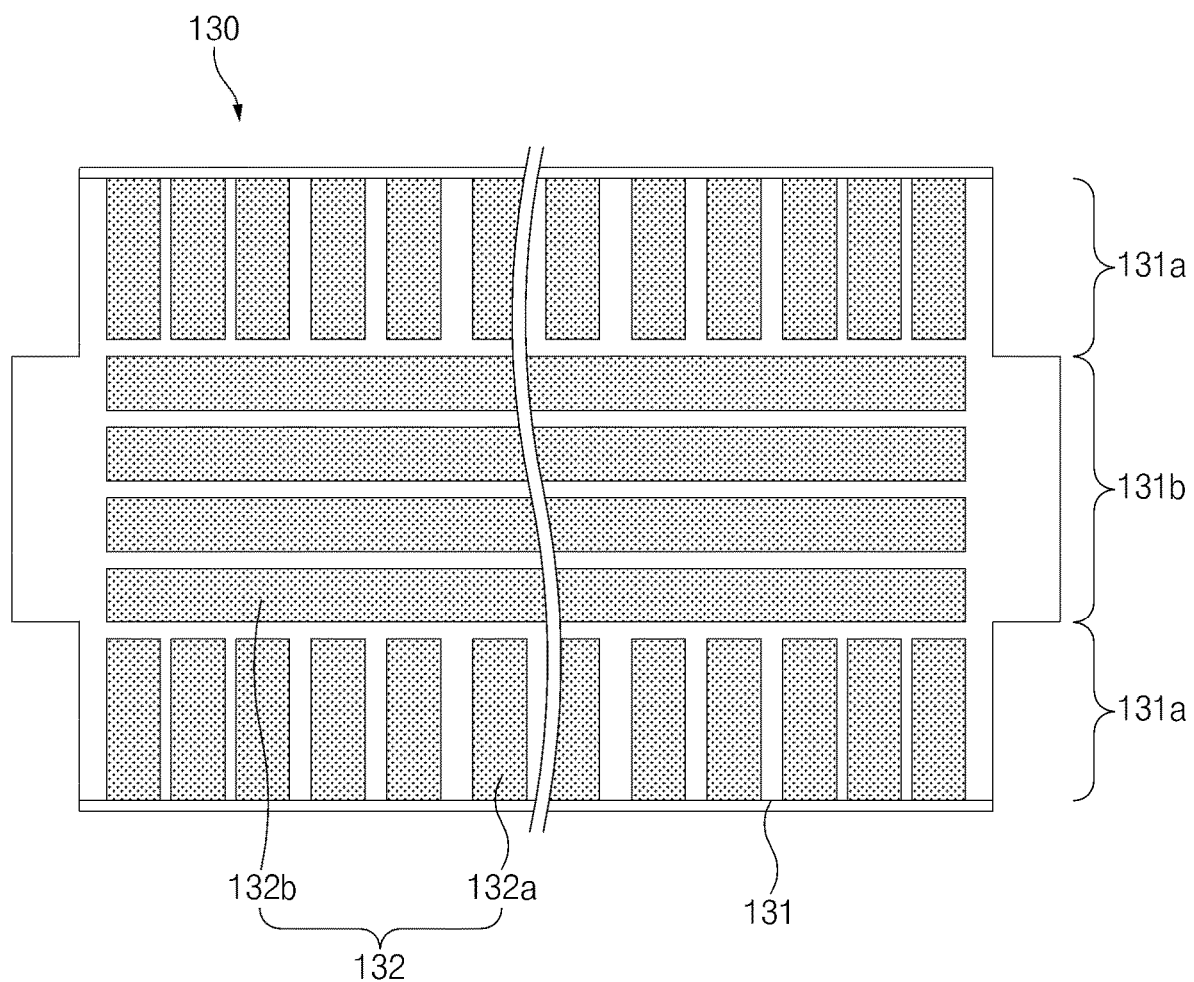
FIG. 4 is a plan view of FIG. 3.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

[Battery Module According to First Embodiment of the Present Invention]

As illustrated in FIGS. 1 to 7, a battery module 100 according to a first embodiment of the present invention has a structure, in which heat dissipation performance of a battery cell is improved, and a temperature deviation of the battery cell is reduced, and comprises a plurality of battery cells 110 disposed to overlap each other in a thickness direction thereof, a battery case 120 accommodating the battery cells 110 and having a structure of which a lower portion is opened, and a heat dissipation member 130 coupled to the lower portion of the battery case 120 to release heat generated in the plurality of battery cells 110, which are accommodated in the battery case 120, to the outside.

Here, in the battery module 100 according to the first embodiment of the present invention, the heat dissipation member is coupled to the lower portion of the battery case as one embodiment, but the heat dissipation member may be provided on an upper portion, a side portion, a front portion, or a rear portion of the battery case according to application of a product.

Battery Cell

The battery cell 110 comprises an electrode assembly, an electrode lead connected to the electrode assembly, and a pouch case accommodating the electrode assembly in a state in which a front end of the electrode lead is drawn out.

The battery cell 110 having the above-described configuration is provided in plurality, which are disposed to overlap each other in the thickness direction, and the plurality of battery cells 110 arranged in the thickness direction have a structure, in which the plurality of battery cells 110 are connected in series or in parallel.

Battery Case

The battery case 120 is configured to accommodate the plurality of battery cells and has a rectangular box shape in which an opening is formed in a lower portion thereof. The plurality of battery cells 110 overlapping each other are accommodated in the battery case 120 through the opening.

Each of the battery cells 110 is accommodated in the battery case 120 in a state in which the electrode lead faces an end in a longitudinal direction of the battery case 120 and is upright.

Heat Dissipation Member

The heat dissipation member 130 comprises a cover plate 131 supporting the battery cell 110 accommodated in the battery case 120 and a heat dissipation body 132 releasing heat generated in the battery cell 110 to the outside.

The cover plate 131 may be coupled to the lower portion of the battery case 120 to finish the lower portion of the battery case 120 and also supports the lower portion of the battery cell 110 accommodated in the battery case 120 to prevent the battery cell 110 from being drawn out to the outside.

Particularly, the cover plate 131 is made of a heat dissipation material that is capable of smoothly releasing the heat of the battery cell, which is transferred from the heat dissipation body.

Here, one surface (a top surface of the cover plate when viewed in FIG. 2) of the cover plate 131, on which the battery cell 110 is supported, comprises first accommodation surfaces 131a that are partitioned at both ends in a thickness direction (a vertical direction when viewed in FIG. 3) of the battery cell 110 and a second accommodation surface 131b partitioned between the first accommodation surfaces 131a, and each of the first and second accommodation surfaces 131a and 131b extends in the longitudinal direction (a left and right direction when viewed in FIG. 4) of the battery cell.

An interface 131c may be further provided between the first and second accommodation surfaces 131a and 131b, and the interface 131c serve to space the first and second accommodation surfaces 131a and 131b from each other so as not to be connected to each other. Here, a width of the interface 131c is formed to be less than the thickness of the heat transfer material provided on each of the first and second accommodation surfaces 131a and 131b. That is, if the thickness of the heat transfer material is 2 mm, the width of the interface is formed to be 1 mm.

The heat dissipation body 132 is provided on one surface of the cover plate 131, on which the battery cell 110 is supported, to absorb the heat generated in the battery cell 110, thereby releasing the heat to the outside. Thus, the heat of the battery cell 110 may be effectively dissipated.

Particularly, the heat dissipation body 132 comprises a first heat transfer material 132a having a structure which is arranged in a plurality of rows in the longitudinal direction (the left and right direction when viewed in FIG. 4) of the battery cell 110 on one surface of the cover plate 131. That is, the first heat transfer material 132a provided in the plurality of rows has an arrangement structure such as a stepping bridge in the longitudinal direction of the battery cell 110 on one surface of the cover plate 131.

The first heat transfer material 132a may be provided as a contact thermal interface material (TIM) and have an adhesive property. Particularly, at least one of heat dissipation grease, a thermal conductive adhesive, or a phase change material may be used as the first heat transfer material 132a.

In the battery cell 110, relatively high-temperature heat is generated at both ends rather than a central portion of the battery cell 110 due to high resistance by the electrode lead. The present invention has the arrangement structure of the first heat transfer materials 132a for reducing the temperature deviation of the battery cell 110 as described above.

That is, the first heat transfer materials 132a have a structure, in which the first heat transfer materials 132a are arranged so that an interval therebetween is gradually narrowed from the central portion (a point at which the battery cell is bisected in the longitudinal direction) toward both ends (both end points of the battery cell in the longitudinal direction). Thus, more first heat transfer materials 132a are arranged at both the ends of the battery cell, which generates high-temperature heat are arranged to significantly improve the heat dissipation performance, and fewer first heat transfer materials 132 are arranged at the central portion of the battery cell, which generate low-temperature heat to slightly improve the heat dissipation performance. Thus, the temperature deviation may be significantly reduced due to a difference in heat dissipation performance between the central portion and both the ends of the battery cell.

Particularly, the first heat transfer material 132a may be provided on the first accommodation surface 131a, and thus, the battery cell 110 disposed outside the battery case in the width direction may be effectively prevented from increasing in temperature.

The interval between the first heat transfer materials 132a having the narrowest interval therebetween among the first heat transfer materials 132a arranged on the first accommodation surface 131a is greater than the thickness of the first heat transfer material 132a. Thus, even if a portion of the first heat transfer material 132a is stretched while pressing the first heat transfer material due to a weight of the battery cell 110, the first heat transfer materials 132a may be prevented from being connected to each other. As a result, a deviation in heat dissipation performance from the center to both the ends of the first heat transfer material 132a may occur to effectively reduce the temperature deviation of the entire battery cell 110.

The heat dissipation body 132 further comprises a second heat transfer material 132b for dissipating heat from the battery cell 110 disposed in the middle of the battery case 120 in the width direction. Here, the second heat transfer material 132b is made of the same material as the first heat transfer material 132a.

That is, the second heat transfer material 132b has a structure in which a plurality of the second heat transfer materials 132b are arranged in the width direction (a vertical direction in FIG. 4) of the battery cell 110 on the second accommodation surface 131b, and the second heat transfer materials 132b arranged in plurality have a long line shape connected to each other in the longitudinal direction of the battery cell 110. Accordingly, the second heat transfer material 132b may effectively absorb the heat generated in the battery cell 110 disposed in the middle of the battery case 120 in the width direction. As a result, the battery cell 110 disposed at the center of the battery case 120 may be significantly improved.

Figure 5:
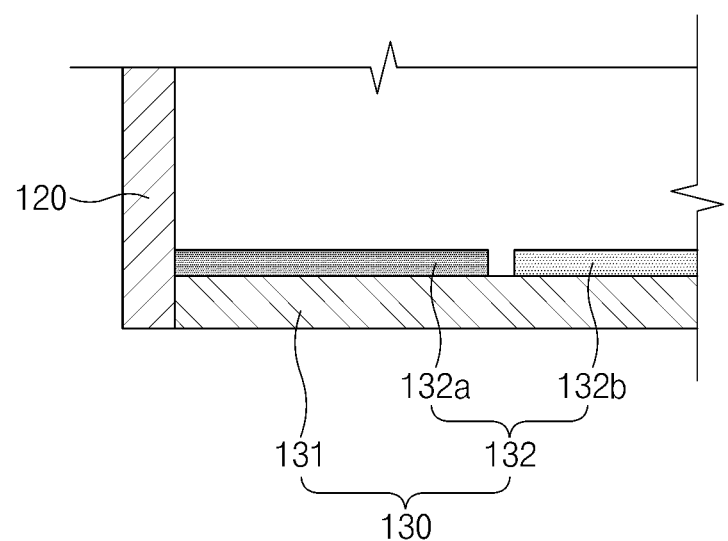
FIG. 5 is a side cross-sectional view of a heat dissipation body before a battery cell is supported in the heat dissipation member of the battery module according to the first embodiment of the present invention.
Figure 6:
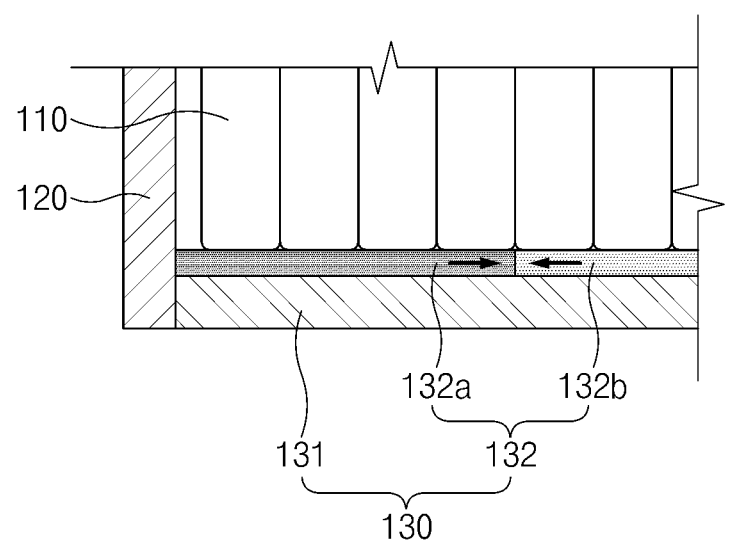
FIG. 6 is a front cross-sectional view of the heat dissipation body after the battery cell is supported in the heat dissipation member of the battery module according to the first embodiment of the present invention.
Figure 7:
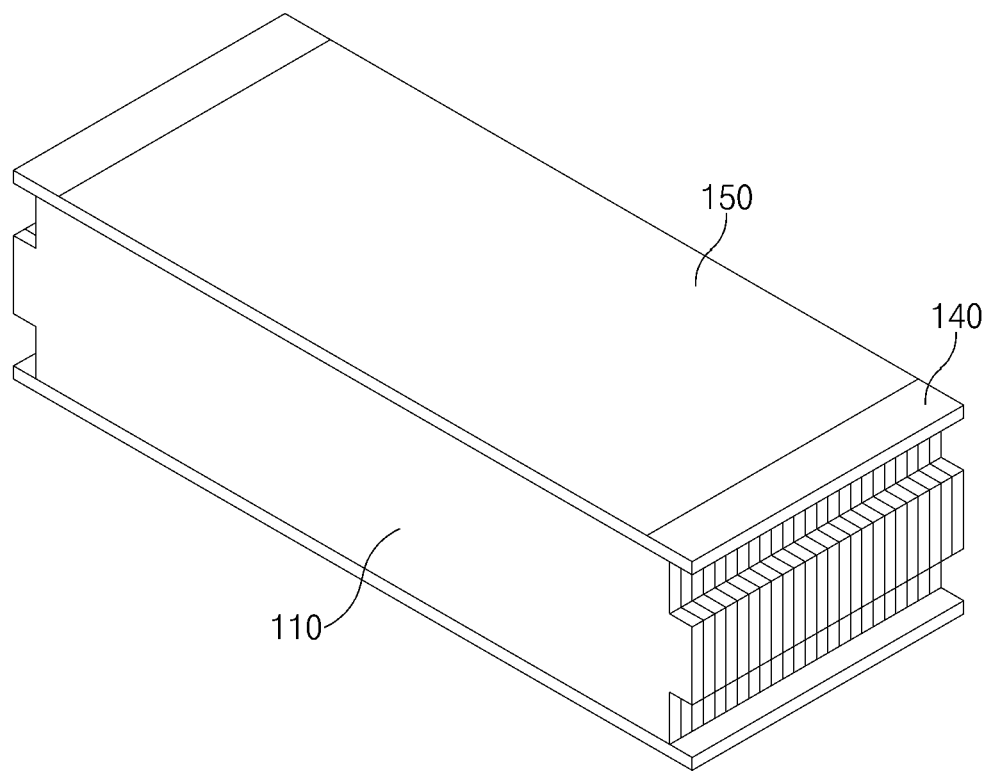
FIG. 7 is a perspective view of a heat dissipation pad and a finishing pad in the battery module according to the first embodiment of the present invention.
Figure 8:
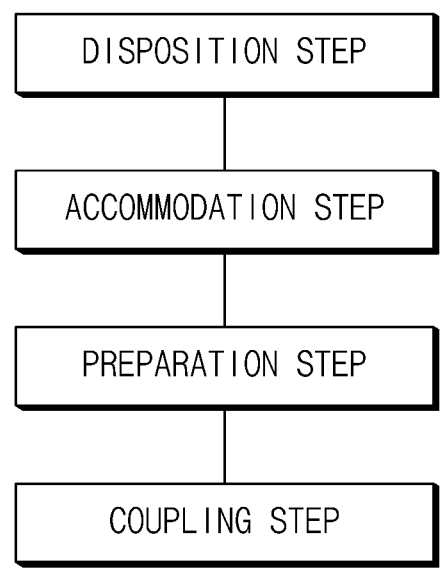
FIG. 8 is a flowchart illustrating a method for manufacturing the battery module according to the first embodiment of the present invention.

Referring to FIG. 5, the plurality of second heat transfer materials 132b arranged on the second accommodation surface 131b are spaced apart from each other so as not to be connected to each other. Also, the second heat transfer material 132b is spaced apart from the first heat transfer material 132a arranged on the first accommodation surface 131a so as not to be connected to each other. However, each of the interval between the second heat transfer material 132b and the second heat transfer material 132b and the interval between the second heat transfer material 132b and the first heat transfer material 132a is formed to be less than the thickness of the second heat transfer material 132b. Thus, referring to FIG. 6, when a portion of the second heat transfer material 132b is stretched while being pressed by the battery cell 110, the second heat transfer material 132b and the second heat transfer material 132b, which are spaced apart from each other, are connected to each other, and the second heat transfer material 132b and the first heat transfer material 132a, which are spaced apart from each other, are connected to each other. As a result, the heat generated in the battery cell may be released to the outside through the entire first and second heat transfer materials.

The battery module 100 according to the first embodiment of the present invention having the above-described configuration comprises the heat dissipation member 130 provided with the cover plate 131 and the heat dissipation body 132 to smoothly dissipate the heat generated in the plurality of battery cells 110 accommodated in the battery case 120. Particularly, the temperature deviation from the center to the end of the battery may be reduced to prevent the battery cell from being deteriorated in performance.

The battery module 100 according to the first embodiment of the present invention further comprises a heat dissipation pad 140.

Heat Dissipation Pad

The heat dissipation pad 140 is configured to reduce a temperature deviation between the upper central portion and both the ends of the battery cell That is, both the ends of the battery cell generate heat having a temperature higher than that of the center of the battery cell because the electrode leads are connected, and thus, the heat dissipation pad 140 may be further provided to reduce the temperature deviation between the center of the top surface and both the ends of the battery cell.

The heat dissipation pad 140 is attached to each of both sides of an inner surface of the battery case 120, and both ends of the top surface of the battery cell 110 accommodated in the battery case 120 are supported to release heat through both the ends of the top surface of the battery cell 110. Thus, the temperature deviation between the center and both the ends of the battery cell may be significantly reduced through the increase in heat dissipation performance at both the ends of the battery cell.

A finishing pad 150 may be further provided to constantly maintain an interval between the heat dissipation pads 140, which are attached to both sides of the inner surface of the battery case 120, respectively.

Finishing Pad

The finishing pad 150 is attached to the inner surface of the battery case 120 between the pair of heat dissipation pads 140 to constantly maintain the interval between the pair of heat dissipation pads 140. Particularly, the finishing pad 150 may finish a space between the pair of heat dissipation pads 140 to prevent the battery cell 110 from being deformed because the battery cell 110 is inserted into the space between the pair of heat dissipation pads 140.

Hereinafter, a method for manufacturing the battery module according to the first embodiment of the present invention will be described.

[Method for Manufacturing Battery Module According to First Embodiment of the Present Invention]

As illustrated in FIGS. 8 to 20, a method for manufacturing the battery module according to the first embodiment of the present invention comprises a disposition step, an accommodation step, a preparation step, and a coupling step.

Disposition Step

In the disposition step, a plurality of battery cells 110 are prepared, the plurality of prepared battery cells 110 are disposed to overlap each other in a thickness direction, and the plurality of battery cells 110, which are disposed to overlap each other, are connected to each other in series or parallel to be in contact with each other.

Accommodation Step

In the accommodating step, the plurality of battery cells 110 overlapping each other are accommodated in the battery case 120 having an opened lower portion. Here, each of the battery cells 110 is accommodated in a state in which the electrode lead faces an end in a longitudinal direction of the battery case 120 and is upright.

The accommodation step further comprises a step of attaching the heat dissipation pad 140 to both ends of an inner surface of the battery case 120, which correspond to both ends of a top surface of the battery cell 110, respectively, and the heat dissipation pad 140 improves heat dissipation performance at both the ends of the top surface of the battery cell 110.

In addition, the accommodation step further comprises a step of attaching a finishing pad 150 to the inner surface of the battery case 120 between the heat dissipation pads 140, and the finishing pad 150 constantly maintains an interval between the pair of heat dissipation pads 140 to finish a space between the pair of heat dissipation pads 140.

Preparation Step

In the preparation step, a heat dissipation member comprising a cover plate 131 having a size and shape corresponding to the opened lower portion of the battery case 120 and a heat dissipation body 132 provided on one surface of the cover plate 131, on which the battery cells 110 are supported, is prepared.

That is, the preparation step comprises a partitioning process, a first apply process for preparing a first heat transfer material, and a second apply process for preparing a second heat transfer material.

Figure 9:
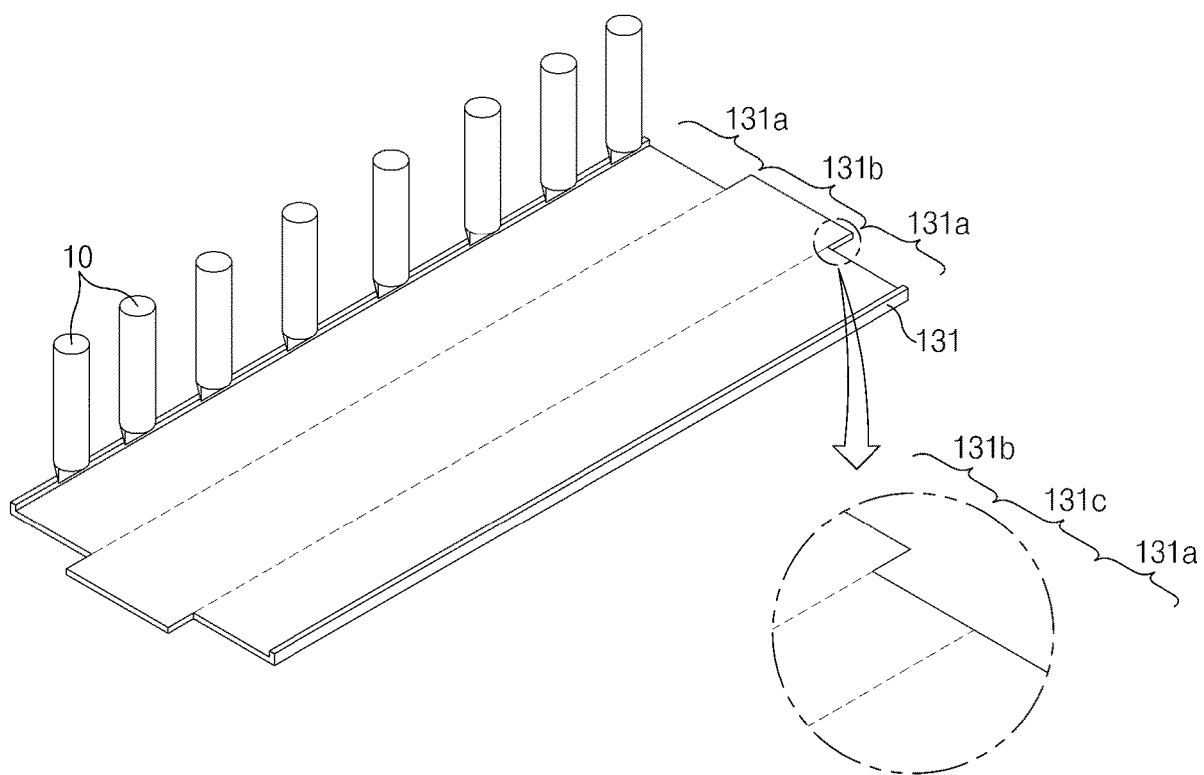
FIGS. 9 to 20 are flowcharts illustrating a preparation step of the method for manufacturing the battery module according to the first embodiment of the present invention.
Figure 10:
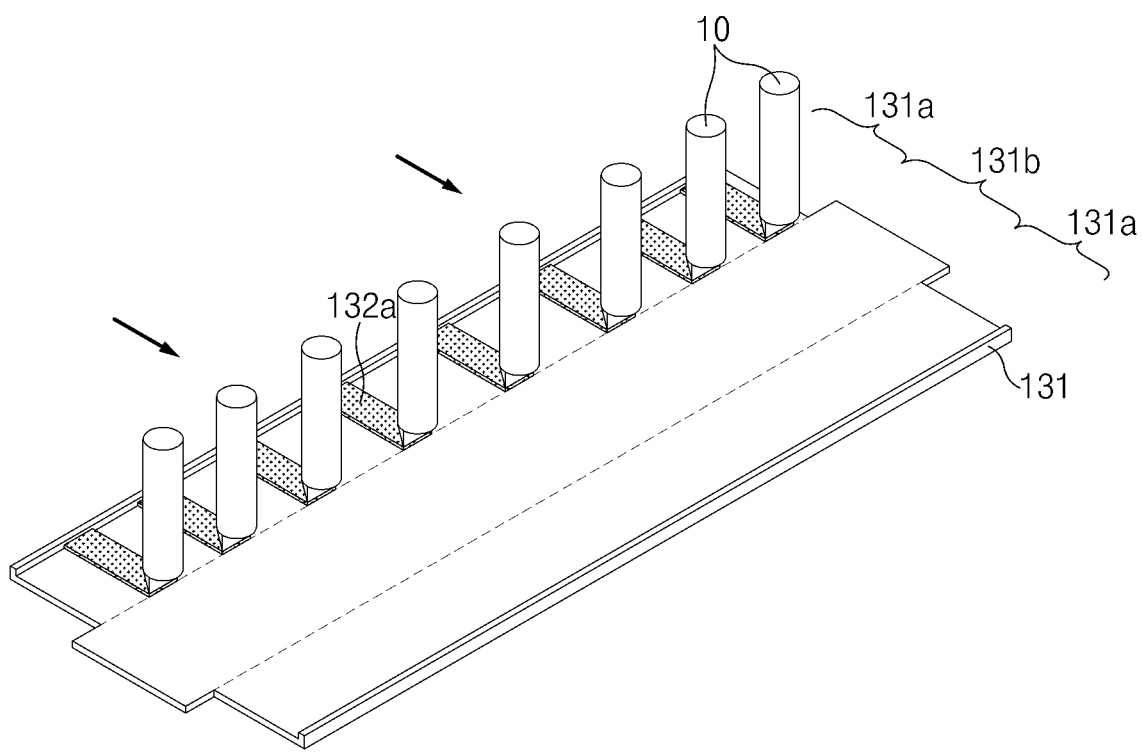

In the partitioning process, as illustrated in FIG. 9, first accommodation surface 131a are partitioned at both ends in a thickness direction of the battery cell 110 on one surface of the cover plate 131, and a second accommodation surface 131b is partitioned between the first accommodation surfaces 131a. Here, an interface 131c is partitioned between the first accommodation surface 131a and the second accommodation surface 131b so that the first accommodation surface 131a and the second accommodation surface 131b are spaced apart from each other.

The first apply process is performed to prepare the first heat transfer material, and a first heat transfer solution is applied to the first accommodation surface 131a to prepare the first heat transfer material.

For example, in the first apply process, a plurality of nozzles 10 are disposed in a longitudinal direction of the cover plate 131 at one side (a rear side of the cover plate when viewed in FIG. 9) of one surface of the cover plate 131. Here, the plurality of nozzles 10 are arranged so that an interval between the nozzles 10 is gradually narrowed from a center to both ends in the longitudinal direction of the cover plate 131. Particularly, in the first apply process, the interval between the plurality of nozzles 10 is adjusted so that the heat transfer material is applied in twice to the first accommodation surface and the second accommodation surface.

Figure 11:
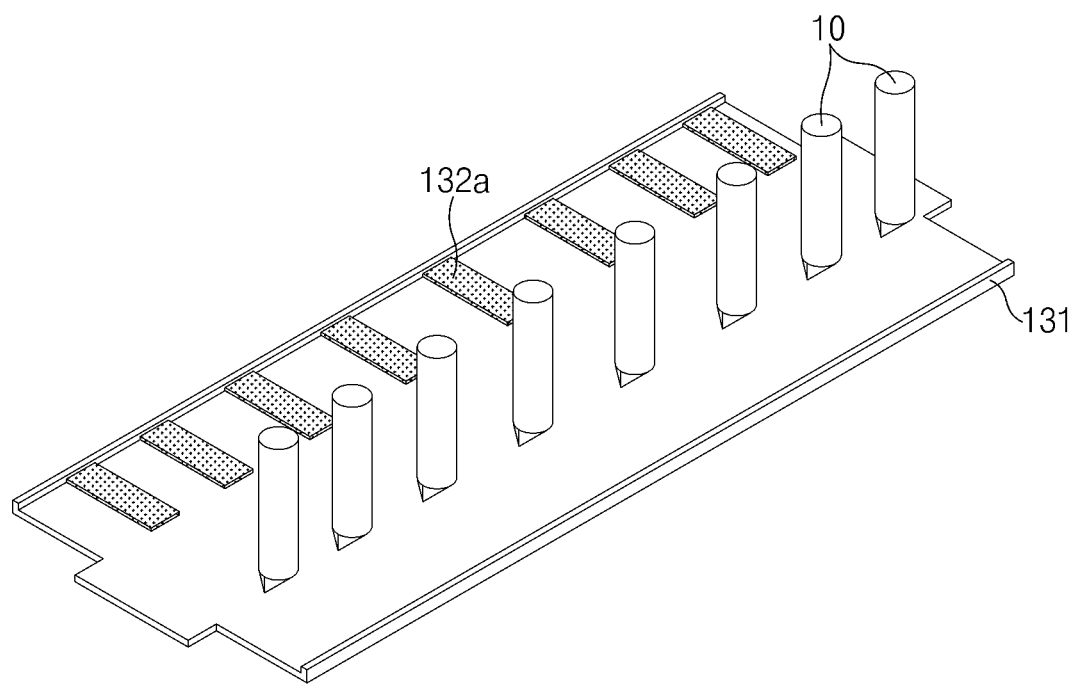
Figure 12:
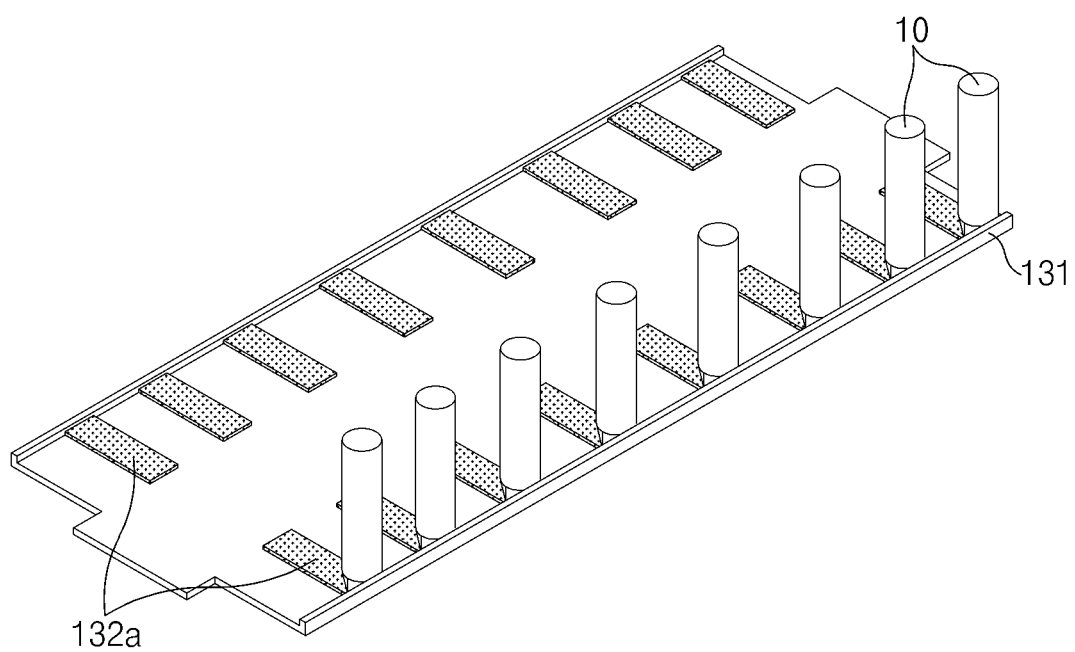

When each of the nozzles 10 is disposed as described above, as illustrated in FIG. 10, the nozzle 10 moves in the width direction of the cover plate 131, and simultaneously, the first heat transfer solution is applied to the first accommodation surface 131a. Also, as illustrated in FIG. 11, the nozzle 10 is disposed at one side of the next first accommodation surface 131a, and then, as illustrated in FIG. 12, the nozzle 10 moves in the width direction of the cover plate 131, and simultaneously, the first heat transfer solution is applied to the first accommodation surface 131a. Then, the first heat transfer solution applied to the first accommodation surface 131a is solidified to obtain the first heat transfer material 132a.

Figure 13:
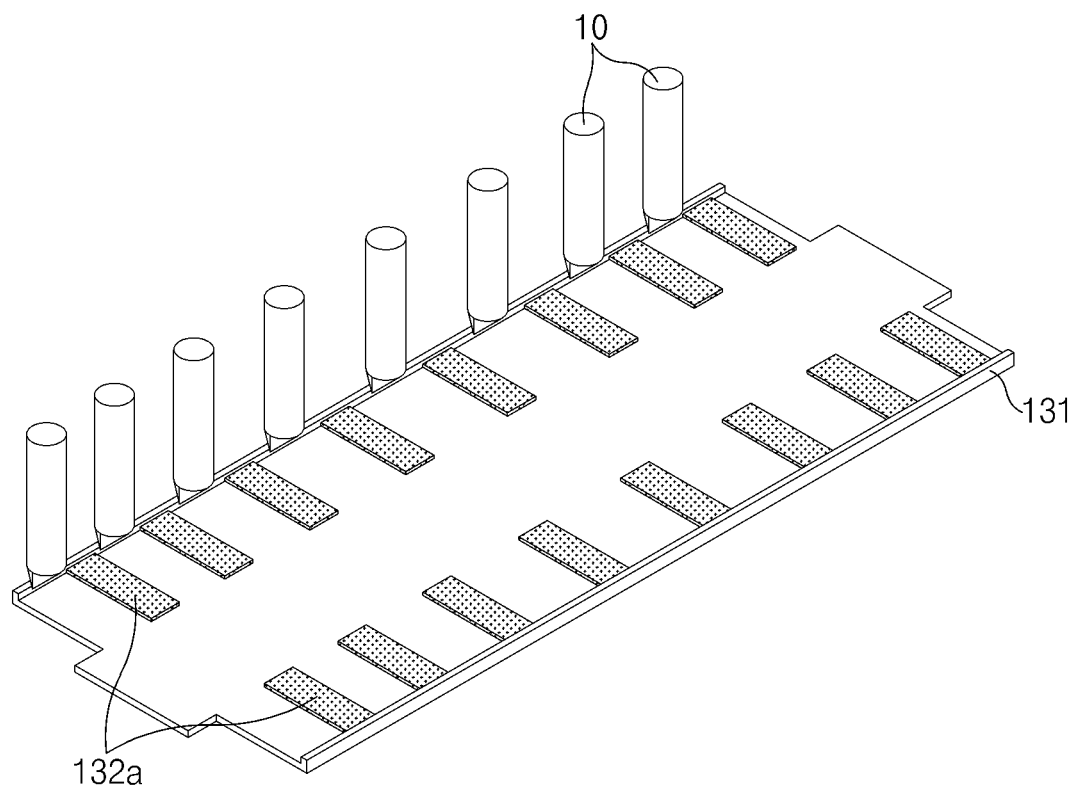
Figure 14:
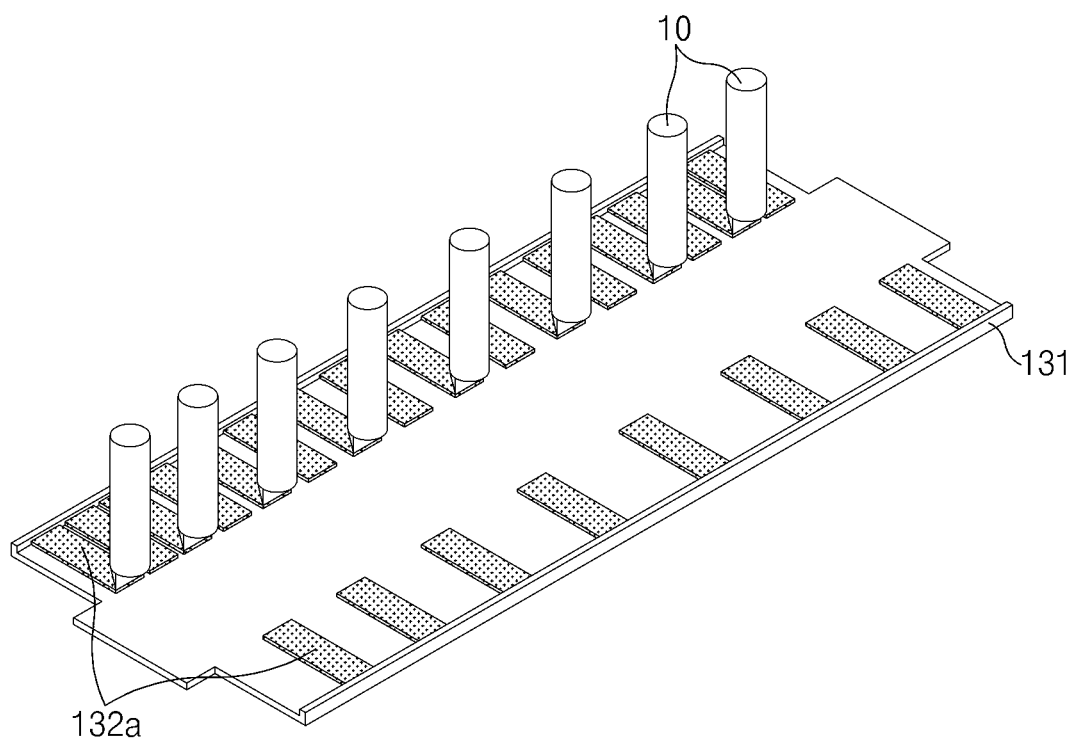
Figure 15:
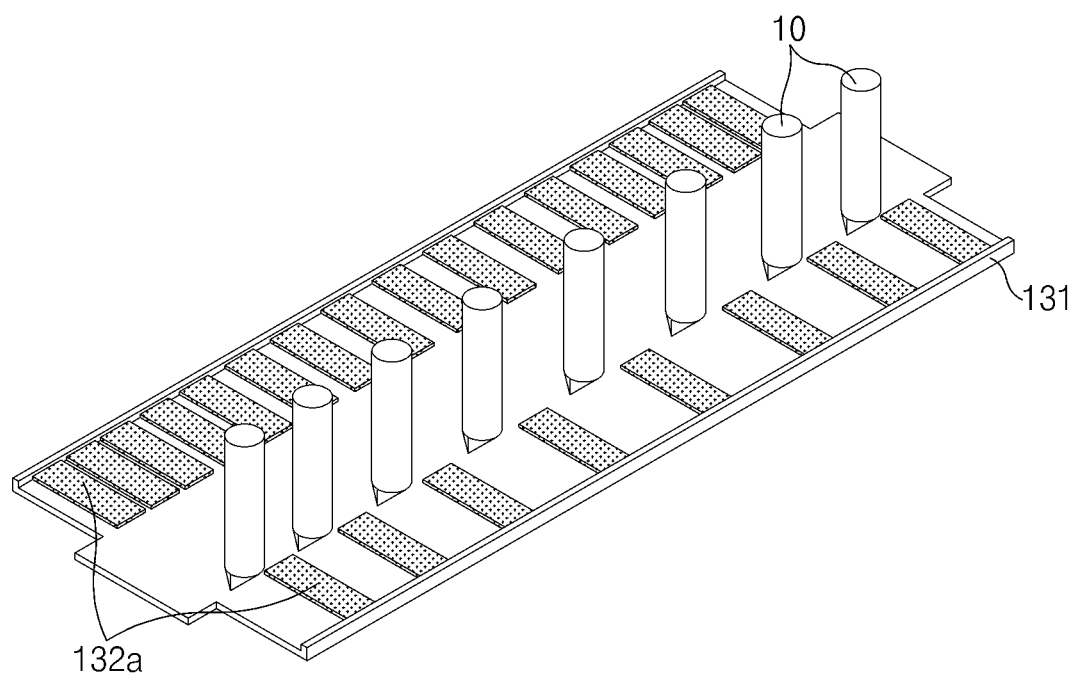
Figure 16:
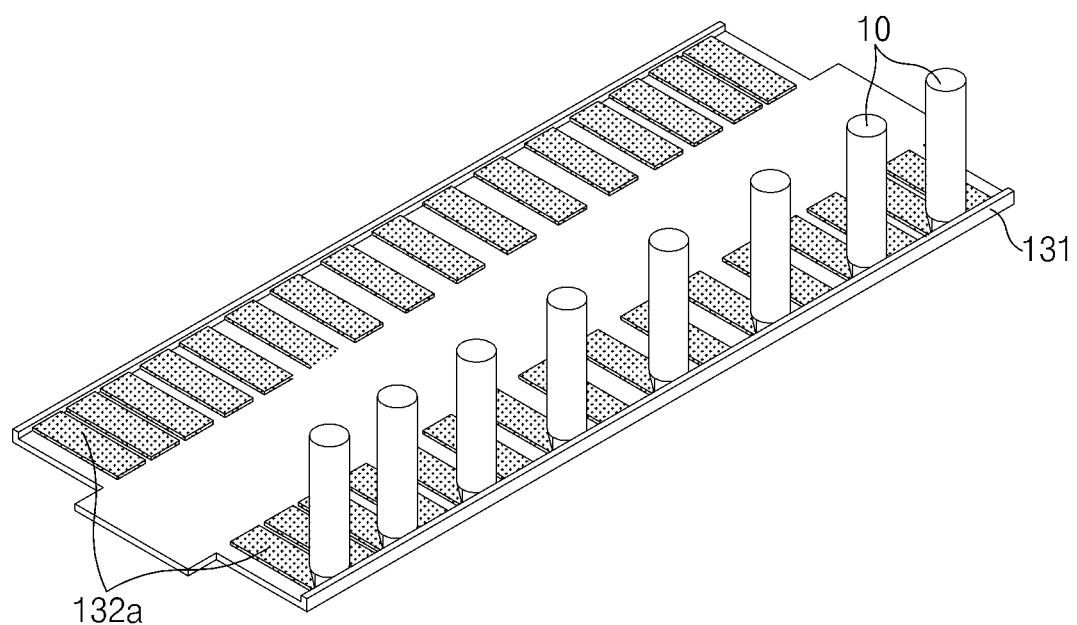

Also, as shown in FIG. 13, the nozzle 10 is disposed between the first heat transfer materials 132a solidified on the first accommodation surface 131a, and then, as illustrated in FIGS. 14 to 16, the first heat transfer solution is applied to the first accommodation surface 131a. Then, the first heat transfer solution applied to the first accommodation surface 131a is solidified to obtain the first heat transfer material 132a. When the above-described operation is completed, the first coating process is completed.

The second apply process is performed to prepare a second heat transfer material, and the second heat transfer material is prepared so that a plurality of second heat transfer materials are arranged in the width direction of the battery cell 110.

For example, in the second apply process, the cover plate 131 on which the first heat transfer material 132a is prepared rotates by an angle of 90° with respect to the nozzle 10, and then, the two nozzles 10 are disposed on the second accommodation surface 131b to adjust the position of the cover plate 131. Here, four second heat transfer materials 132b are prepared on the second accommodation surface. After the two second heat transfer materials 132b are prepared primarily, the two second heat transfer materials 132b are prepared secondarily.

Figure 17:
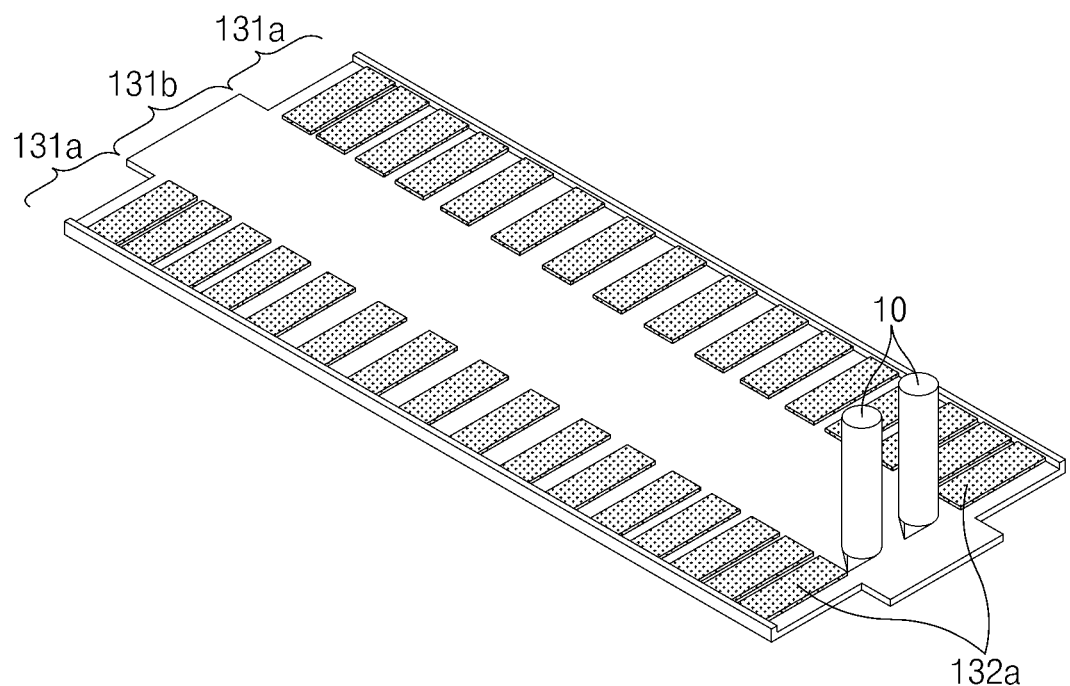
Figure 18:
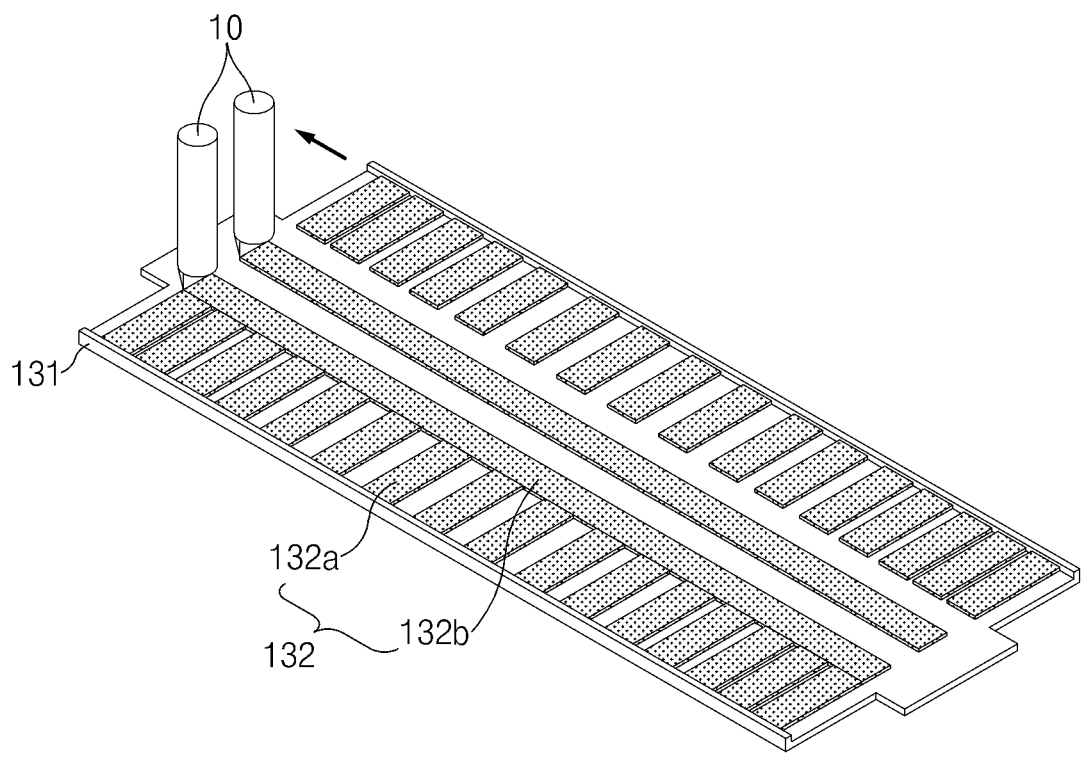
Figure 19:
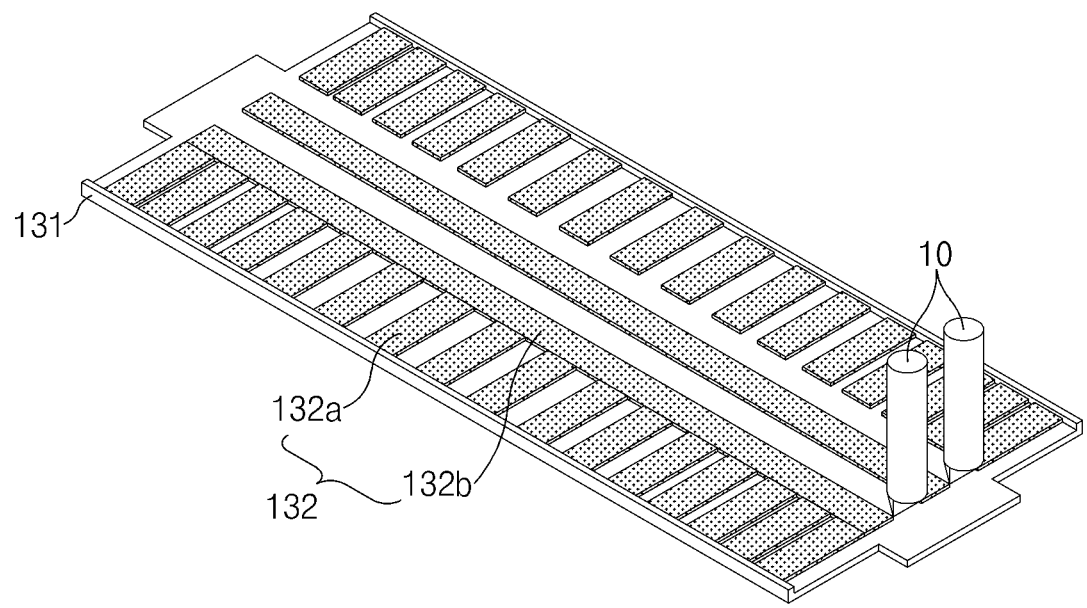
Figure 20:
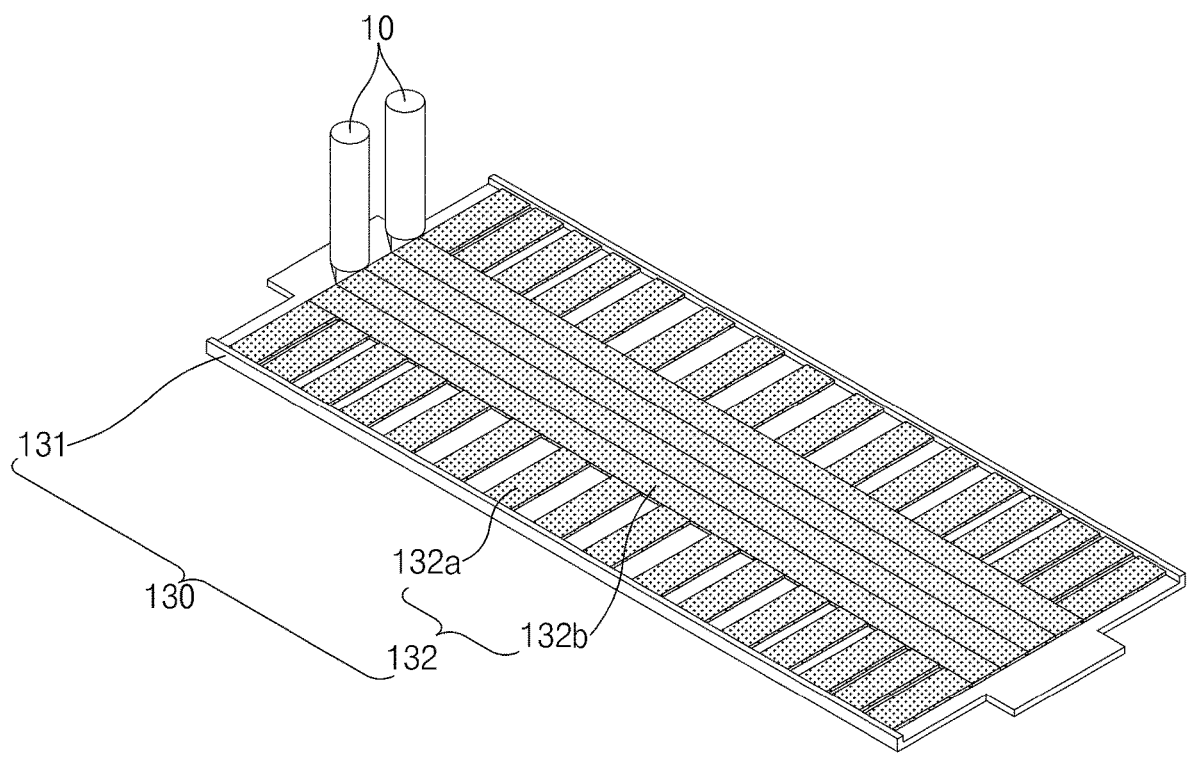

That is, as illustrated in FIGS. 17 and 18, the two nozzles 10 move in the longitudinal direction of the cover plate 131, and simultaneously, the second heat transfer solution is applied to the second accommodation surface 132b. Then, as illustrated in FIGS. 19 and 20, the two nozzles 10 are positioned between the primarily applied second heat transfer solutions and then move in the longitudinal direction of the cover plate 131, and simultaneously, the second heat transfer solution is applied to the second accommodation surface 132b. Then, while the second heat transfer solution is solidified, the second heat transfer material 132b may be prepared. When the above-described operation is completed, the second coating process is completed.

In the second apply process, the plurality of second heat transfer materials 132b are not connected to each other and also are applied so as not to be connected to the first heat transfer materials 132a arranged on the first accommodation surface 131a.

When the above-described process is completed, the finished heat dissipation member 130 may be obtained.

Coupling Step

In the coupling step, the cover plate 131 on which the heat dissipation member 130 is manufactured is coupled to a lower portion of the battery case 120. Then, the lower portion of the battery cell 110 accommodated in the battery case 120 is supported by the first and second heat transfer materials 132a and 132b provided on the cover plate 131.

Here, the first and second heat transfer materials 132a and 132b are stretched while being pressed by a weight of the battery cell 110, and thus, adhesion between the battery cell 110 and the first and second heat transfer materials 132a and 132b may increase.

Particularly, as the second heat transfer material 132b is stretched, the four second heat transfer materials are connected to each other, and thus, the heat dissipation performance of the four second heat transfer materials may be uniformed. As a result, the battery cell supported by the four second heat transfer materials may be improved in heat dissipation performance to reduce the temperature deviation. Furthermore, since the first heat transfer materials are arranged so that an interval therebetween is gradually narrowed from the center to both the ends of the battery cell, the temperature difference between the center and both the ends of the battery cell may be significantly reduced.

Therefore, when the method for manufacturing the battery module according to the first embodiment of the present invention is completed, the finished battery module may be manufactured.

Hereinafter, in descriptions of another embodiment of the present invention, constituents having the same function as the above-mentioned embodiment have been given the same reference numeral in the drawings, and thus duplicated description will be omitted.

[Battery Module According to Second Embodiment of the Present Invention]

Figure 21:
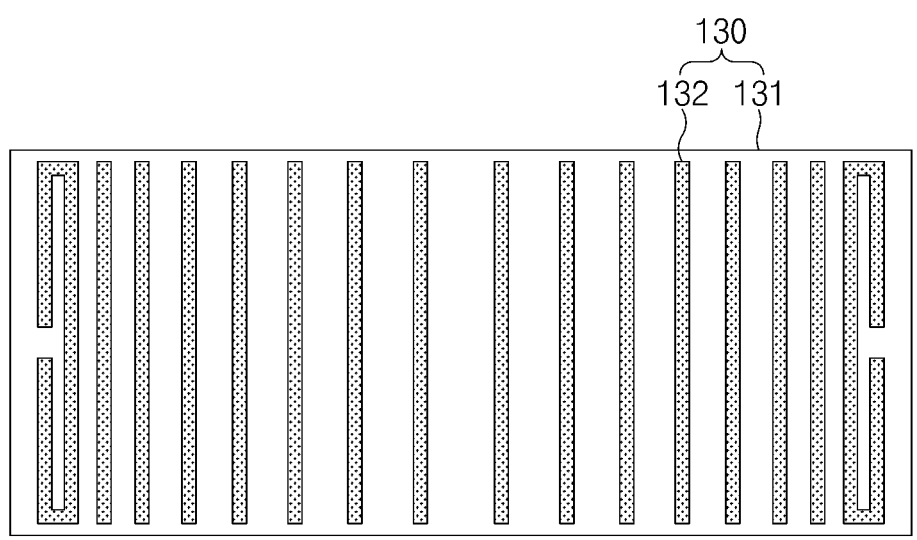
FIG. 21 is a plan view illustrating a heat dissipation member of a battery module according to a second embodiment of the present invention.

As illustrated in FIG. 21, a battery module 100 according to a second embodiment of the present invention comprises a first heat transfer material 132a having a structure which is arranged in a plurality of rows in a longitudinal direction (the left and right direction when viewed in FIG. 21) of a battery cell 110 on one surface of a cover plate 131.

Here, the first heat transfer materials 132a have an arrangement structure in which an interval therebetween is gradually narrowed from a center to both ends of the battery cell 110.

Particularly, each of the first heat transfer materials 132a arranged at both the ends in a longitudinal direction of the battery cell 110 has a "C" shape of which an end faces the outside of the battery cell 110.

Thus, in the battery module 100 according to the second embodiment of the present invention, an area of each of the first heat transfer materials 132a arranged at both the ends in the longitudinal direction of the battery cell 110 may increase, and as a result, the battery cell 110 may be significantly improved in heat dissipation performance at both the ends thereof. This may greatly reduce the temperature deviation between the center and both the ends of the battery cell.

[Battery Module According to Third Embodiment of the Present Invention]

Figure 22:
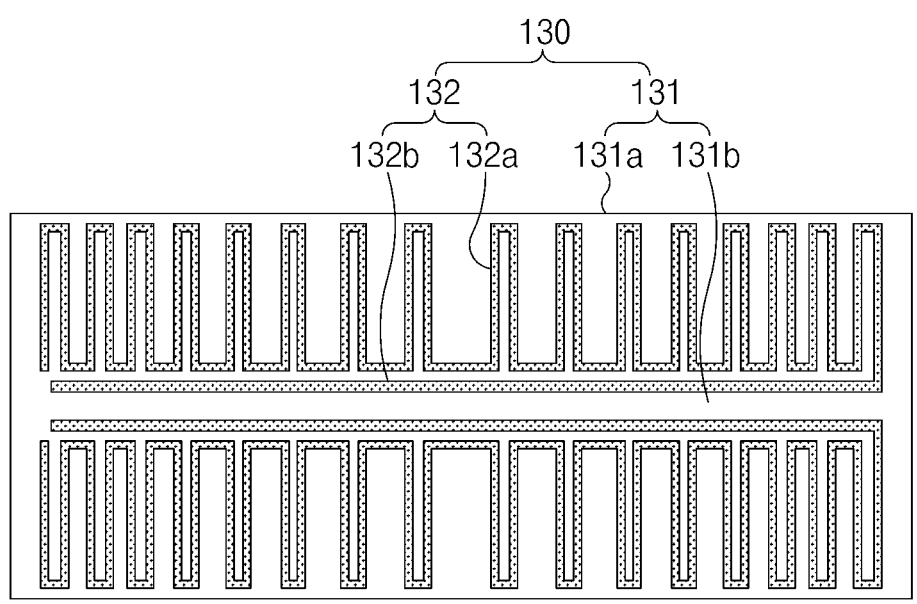
FIG. 22 is a plan view illustrating a heat dissipation member of a battery module according to a third embodiment of the present invention.

As illustrated in FIG. 22, a battery module 100 according to a third embodiment of the present invention comprises a heat dissipation member 130 provided with a cover plate 131 and a heat dissipation body 132.

The cover plate 131 comprises first accommodation surfaces 131a partitioned at both ends in a thickness direction of the battery cell 110 on one surface thereof and a second accommodation surface 131b disposed between the first accommodation surfaces 131a. Here, the first and second accommodation surfaces 131a and 131b are partitioned to extend in a longitudinal direction of the battery cell 110.

The heat dissipation body comprises a first heat transfer material 132a and a second heat transfer material 132b. The first heat transfer materials 132a have a structure, in which the first heat transfer materials 132a are connected in a concave-convex shape from one end to the other end of the first accommodation surface, and the second heat transfer material is provided in a longitudinal direction of the battery cell 110 on the second accommodation surface 131b and connected to the other end of the first heat transfer material 132a.

Therefore, the battery module 100 according to the third embodiment of the present invention may effectively dissipate heat generated in the entire battery cell by connecting the entire first and second heat transfer materials to each other, and as a result, a temperature deviation of the battery cell may be reduced.

Experimental Example

Comparative Example

In Comparative Example, a battery module comprising a plurality of battery cells, a battery case, and a heat dissipation member is prepared. Here, the heat dissipation member comprises a cover plate and a heat transfer material provided on the cover plate. The heat transfer material has a structure in which heat transfer materials are arranged at the same interval from one side to the other side of the battery cell.

Manufacturing Example

In Manufacturing Example, a battery module comprising a plurality of battery cells, a battery case, and a heat dissipation member is prepared. Here, the heat dissipation member comprises a cover plate and first and second heat transfer materials provided on the cover plate. The first heat transfer materials have an arrangement structure in which an interval therebetween is gradually narrowed from a center to both ends of the battery cell.

That is, in Manufacturing Example, the battery module has the same configuration as the battery module according to the first embodiment of the present application.

Same Condition

In Comparative Example and Manufacturing Example, charging and discharging are performed under the same environment and at the same voltage, and configurations according to Comparative Example and Manufacturing Example are photographed using a thermovision camera during the charging and discharging.

Photographing Result

Figure 23:
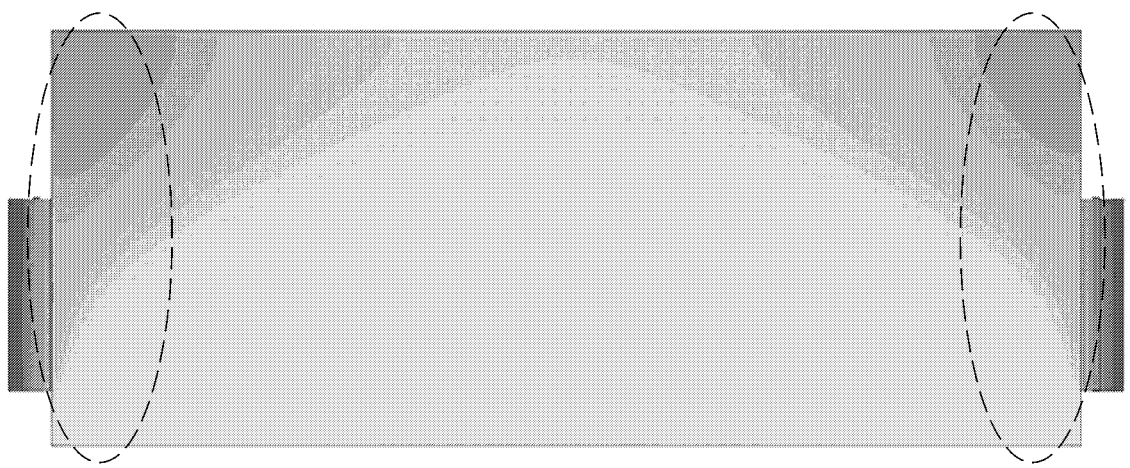

In Comparative Example, referring to FIG. 23, it is seen that a temperature of each of both ends of the battery cell is high, and in particular, it is confirmed that a temperature difference between a center and both the ends of the battery cell occurs.

Figure 24:
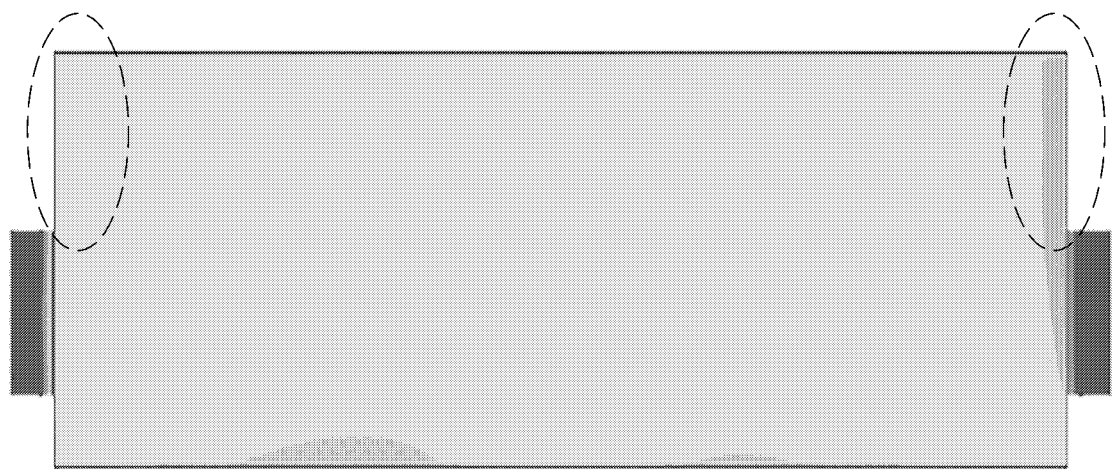

In Manufacturing Example, referring to FIG. 24, it is seen that a temperature deviation between the center and both the ends of the battery cell does not occur significantly, that is, it is confirmed that the battery cell has a temperature less than that in Comparative Example as a whole, and a maximum value of the temperature deviation between two points, i.e., a central side and an outer side in the battery cell is smaller. It is seen that the temperature deviation between the center and the end of the battery cell is greatly reduced.

Accordingly, the scope of the present invention is defined by the appended claims more than the foregoing description and the exemplary embodiments described therein. Various modifications made within the meaning of an equivalent of the claims of the invention and within the claims are to be regarded to be in the scope of the present invention.

DESCRIPTION OF THE SYMBOLS

100: Battery module
110: Battery cell
120: Battery case
130: Heat dissipation member
131: Cover plate
131a: First accommodation surface
131b: Second accommodation surface
132: Heat dissipation body
132a: First heat transfer material
132b: Second heat transfer material
140: Heat dissipation pad
150: Finishing pad

The invention claimed is:

1. A battery module comprising:
a plurality of battery cells overlapping each other in a thickness direction thereof;
a battery case accommodating the battery cells therein and having a structure in which a lower portion is opened; and
a heat dissipation member comprising a cover plate coupled to the lower portion of the battery case and supporting the battery cells and a heat dissipation body disposed on a first surface of the cover plate, the battery cells being supported on the heat dissipation member, the heat dissipation member being configured to dissipate heat generated in the battery cells,
wherein the heat dissipation body comprises first heat transfer materials aligned in a plurality of rows disposed adjacent to one another along a longitudinal direction of the battery cells on the first surface of the cover plate, and
the first heat transfer materials are aligned so that an interval therebetween is gradually narrowed from a center to two opposite ends of the battery cells, the first heat transfer materials being configured to improve heat dissipation performance in the longitudinal direction from the center to the two opposite ends of the battery cells, and
wherein the first surface of the cover plate comprises first accommodation surfaces that are partitioned at two opposite ends of the cover plate in a thickness direction of the battery cells and a second accommodation surface partitioned between the first accommodation surfaces, wherein the first and second accommodation surfaces each extend in the longitudinal direction of the battery cells, and the first heat transfer materials are disposed on the first accommodation surfaces.

2. The battery module of claim 1, wherein an interval between two adjacent ones of the first heat transfer materials that have a narrowest interval therebetween is greater than a thickness of the first heat transfer material.

3. The battery module of claim 1, wherein the heat dissipation body further comprises a plurality of second heat transfer materials disposed adjacent to one another along a width direction of the battery cells on the second accommodation surface, and the second heat transfer materials are arranged at a same interval from one another on the second accommodation surface.

4. The battery module of claim 3, wherein the plurality of second heat transfer materials are spaced apart from each other and are spaced apart from the first heat transfer materials.

5. The battery module of claim 1, further comprising a pair of heat dissipation pads that are configured to reduce a temperature deviation between the center and the two opposite ends of the battery cell by releasing the heat generated at the two opposite ends of the battery cell, the pair of heat dissipation pads being provided on two opposite ends of an inner surface of the battery case, respectively.

6. The battery module of claim 5, further comprising a finishing pad that is disposed within a space between the pair of heat dissipation pads, the finishing pad being provided on the inner surface of the battery case between the pair of heat dissipation pads.

7. The battery module of claim 1, wherein outermost ones of the first heat transfer materials disposed at the two opposite ends of the battery cells each have a "C" shape of which an opening of the "C" shape faces an outside of the battery module.

8. The battery module of claim 1, wherein the first surface of the cover plate comprises first accommodation surfaces that are partitioned at two opposite ends of the cover plate in a thickness direction of the battery cells and a second accommodation surface partitioned between the first accommodation surfaces, wherein the first and second accommodation surfaces each extend in the longitudinal direction of the battery cells,
the first heat transfer materials are connected to one another in a concave-convex shape from a first end to a second opposite end of the first accommodation surface, and
the heat dissipation body further comprises a second heat transfer material extending in the longitudinal direction of the battery cells on the second accommodation surface and connected to an end of an outermost one of the first heat transfer materials.

9. A method for manufacturing a battery module, the method comprising:
disposing a plurality of battery cells to overlap each other in a thickness direction thereof;
accommodating the plurality of overlapping battery cells in a battery case of which a lower portion is opened;
preparing a heat dissipation member comprising a cover plate and a heat dissipation body provided on a first surface of the cover plate, the battery cells being supported on the first surface of the cover plate; and
coupling the cover plate of the heat dissipation member to the lower portion of the battery case,
wherein the preparing comprises a first apply process, in which a first heat transfer material is applied to the first surface of the cover plate aligned in a plurality of rows in a longitudinal direction of the battery cells, wherein intervals between adjacent ones of the first heat transfer materials are gradually narrowed from a center of the battery cells to two opposite ends of the battery cells, and
wherein the preparing comprises, before the first apply process, partitioning the first surface of the cover plate into first accommodation surfaces at two opposite ends of the cover plate in a thickness direction of the battery cells and a second accommodation surface disposed between the first accommodation surfaces, and during the first apply process, the first heat transfer materials are applied to the first accommodation surface.

10. The method of claim 9, wherein the preparing further comprises, after the first apply process, a second apply process of applying a plurality of second heat transfer materials disposed adjacent to one another along a width direction of the battery cells on the second accommodation surface.

11. The method of claim 10, wherein, during the second apply process, the plurality of second heat transfer materials are spaced apart from each other and are spaced apart from the first heat transfer materials.

12. The method of claim 9, wherein the accommodating further comprises respectively attaching heat dissipation pads to first and second opposite ends of an inner surface of the battery case that are respectively adjacent to the two opposite ends of the battery cell.

13. The method of claim 12, wherein the accommodating further comprises attaching a finishing pad to the inner surface of the battery case between the heat dissipation pads.

* * * * *